(12) United States Patent
Bates et al.

(10) Patent No.: US 7,043,690 B1
(45) Date of Patent: May 9, 2006

(54) METHOD, SYSTEM, AND PROGRAM FOR CHECKING CONTACT INFORMATION

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 09/658,078

(22) Filed: Sep. 11, 2000

(51) Int. Cl.
  *G06F 17/00* (2006.01)
  *G06F 17/21* (2006.01)
  *G06F 17/24* (2006.01)
  *G06F 15/00* (2006.01)

(52) U.S. Cl. .................. 715/533; 715/532; 715/531
(58) Field of Classification Search ............. 715/531, 715/530, 540, 534; 345/739
  See application file for complete search history.

(56) References Cited

U.S. PATENT DOCUMENTS

| | | | |
|---|---|---|---|
| 5,119,437 A * | 6/1992 | Kuwamura et al. ......... 382/175 |
| 5,842,195 A * | 11/1998 | Peters et al. .................. 707/1 |
| 5,859,636 A * | 1/1999 | Pandit ...................... 715/501.1 |
| 5,872,640 A * | 2/1999 | Cohen et al. ............... 358/434 |
| 5,892,919 A * | 4/1999 | Nielsen ...................... 709/228 |
| 5,907,680 A * | 5/1999 | Nielsen ...................... 709/228 |
| 5,920,854 A * | 7/1999 | Kirsch et al. ................... 707/3 |
| 6,032,053 A * | 2/2000 | Schroeder et al. ........ 455/553.1 |
| 6,049,796 A * | 4/2000 | Siitonen et al. ................ 707/3 |
| 6,189,009 B1 * | 2/2001 | Stratigos et al. .............. 707/10 |
| 6,324,541 B1 * | 11/2001 | de l'Etraz et al. ........ 707/104.1 |
| 6,339,795 B1 * | 1/2002 | Narurkar et al. ............ 709/246 |
| 6,405,060 B1 * | 6/2002 | Schroeder et al. .......... 455/566 |
| 6,405,225 B1 * | 6/2002 | Apfel et al. ................. 715/526 |
| 6,597,783 B1 * | 7/2003 | Tada et al. ............. 379/265.09 |
| 6,671,718 B1 * | 12/2003 | Meister et al. .............. 709/206 |
| 6,711,624 B1 * | 3/2004 | Narurkar et al. ............ 719/321 |

OTHER PUBLICATIONS

Courter, Gini; Marquis, Annette; Mastering Microsoft Office 2000 Professional Edition; May 1999; Sybex.*

* cited by examiner

*Primary Examiner*—Heather R. Herndon
*Assistant Examiner*—N Hillery
(74) *Attorney, Agent, or Firm*—Konrad Raynes & Victor, LLP

(57) ABSTRACT

Provided is a computer implemented method, system, and program for checking text in an electronic document. Words in the text are scanned and parsed. For each set of one or more scanned and parsed words, a determination is made of whether one or more words form a contact phrase providing information to identify or address a person or entity. After one contact phrase is scanned, contact information is accessed including contact phrases. The contact information is searched to determine if the scanned contact phrase matches contact phrases in the searched contact information.

27 Claims, 5 Drawing Sheets

METHOD, SYSTEM, AND PROGRAM FOR CHECKING CONTACT INFORMATION

BACKGROUND OF THE INVENTION

1. Field of the Invention

Preferred embodiments provide a method, system, and program for enhancing a spell checking program to handle contact information, such as universal resource locators (URLs), e-mail addresses, names, street addresses, phone numbers, etc.

2. Description of the Related Art

Most word processing programs, such as LOTUS WORD PRO, MICROSOFT WORD, and COREL WORDPERFECT,** include a spell checker feature. Prior art spell checker programs notify the user of a spelling error whenever encountering an e-mail address, e.g., "joe@us.ibm.com", universal resource locator (URL) address "http://www.ibm.com", personal name, e.g., "Joe Smith", and street address, e.g., 100 Mullberry Street. Typically, the user of the word processing program will bypass the personal name, street address, e-mail address, and URL address. Thus, prior art spell checkers include limited capability in providing meaningful handling of contact information, such as personal names, street addresses, and electronic addresses, such as e-mail and URL addresses.

**WordPerfect is a registered trademark of Corel Corporation; Word Pro is a registered trademark of Lotus Development Corporation.

Accordingly, there is a need in the art to enhance spell checker functionality to provide a more meaningful handling and analysis of names, addresses, phone numbers, and other contact information in a document.

SUMMARY OF THE PREFERRED EMBODIMENTS

To overcome the limitations in the prior art described above, preferred embodiments disclose a computer implemented method, system, and program for checking text in an electronic document. Words in the text are scanned and parsed. For each set of one or more scanned and parsed words, a determination is made of whether one or more words form a contact phrase providing information to identify or address a person or entity. After one contact phrase is scanned, contact information is accessed including contact phrases. The contact information is searched to determine if the scanned contact phrase matches contact phrases in the searched contact information.

In further embodiments, contact phrases comprise one of a name, phone number, street address, e-mail address, and URL. Further, the contact information may comprise contact records for different contacts in a computer readable address book. In such case, each contact record is capable of including multiple different contact phrases for one contact person or entity.

In still further embodiments, a determination is made of one or more contact phrases in the contact information that are similar to the scanned contact phrase if the scanned contact phrase does not match one contact phrase in the contact information. The determined similar contact phrases are displayed. Moreover, the user is capable of selecting one displayed similar contact phrase to substitute for the scanned contact phrase.

Additional embodiments concern, a method, system, and program for checking contact phrases providing information to identify or address a person or entity in a contact record in a computer readable address book. One contact phrase in one of the contact records in the address book is accessed. A search request is submitted to a computer readable directory over a network. The directory provides searchable contact information including contact phrases on persons or entities. The search request determines whether the accessed contact phrase from one contact record matches one contact phrase in the directory. Search results information is received from the directory. The received search result information may be used to update one or more contact phrases in one contact record of the address book.

Preferred embodiments provide a computer implemented technique to enhance spell checker programs to improve the handling and checking of contact information, such as names and contact addresses of persons and entities. Further embodiments provide additional on-line checking of contact information in a document or contact information in a computer readable address book by accessing a computer readable directory over a network, such as the Internet.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
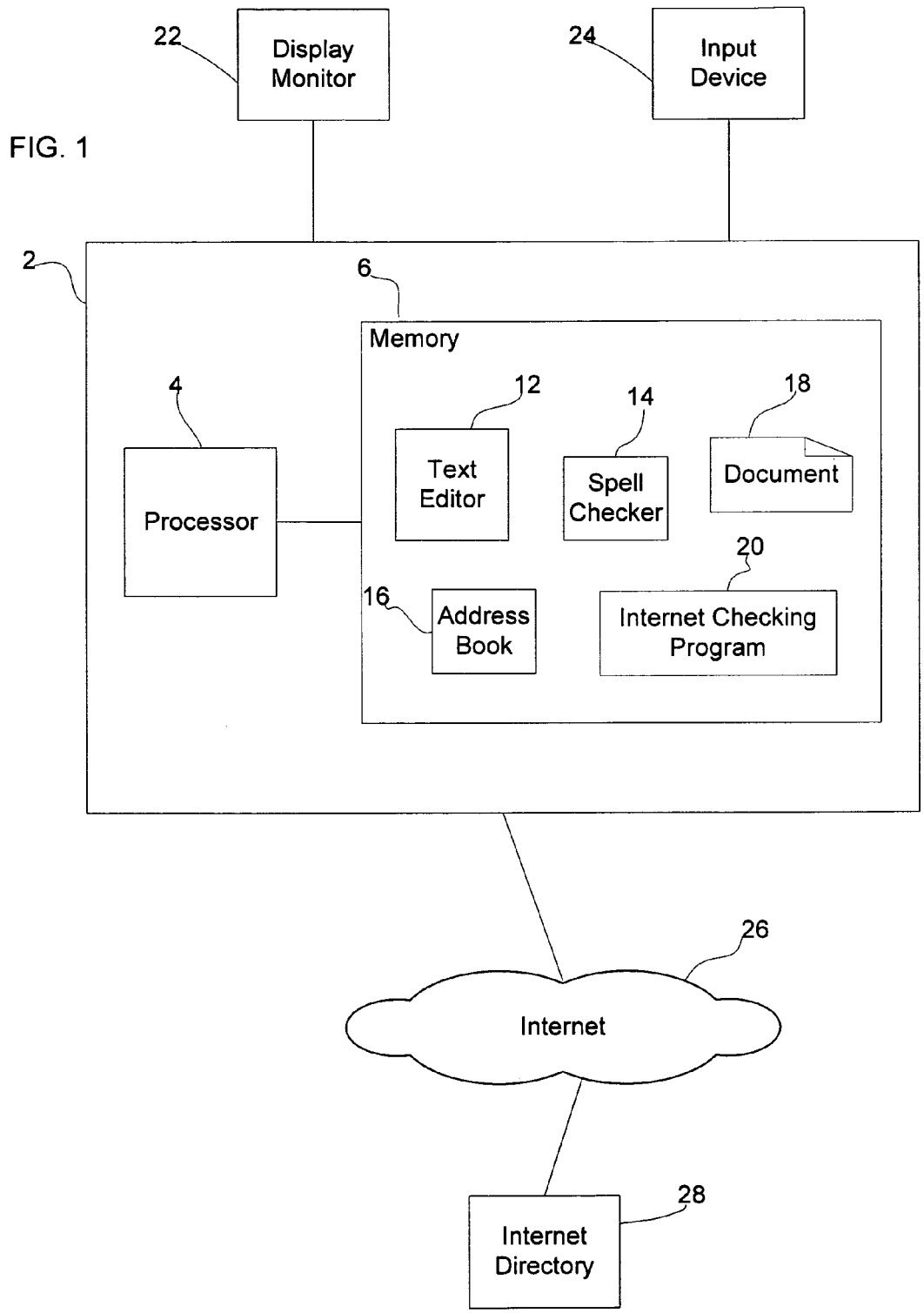
FIG. 1 illustrates a computing environment in which preferred embodiments are implemented.

FIG. 1 illustrates a computing environment in which preferred embodiments are implemented. The computing environment includes a computer system 2 having a processor 4 and a memory 6. The processor 4 may comprise any computer microprocessor device known in the art. The memory 6 may comprise any computer volatile memory device known in the art for storing data structures that the processor 4 is accessing and processing. Alternatively, the memory 6 may comprise any type of non-volatile storage device known in the art capable of being accessed by the processor 4, such as a hard disk drive, tape drive, etc.

The memory 6 includes a text editor program 12, a spell checker program 14, address book 16, and document 18. The text editor program 12 executes in memory 6 to provide a graphical user interface (GUI) text editing tool known in the art, such as word processing programs like WORDPERFECT, MICROSOFT WORD, LOTUS WORD PRO, etc.**

The spell checker program 14 may be a component within the installed text editor program 12 or a separate utility that is integrated with the text editor program 12 user interface. The spell checker program 14 includes the spell checking capabilities of spell checking programs known in the art and the additional capabilities of the preferred embodiments described herein. The address book 16 comprises a computer readable database of address and contact information maintained by the user, a program for accessing the address book 16, and an interface to allow the user to input contact information. The address book 16 may be part of an e-mail program or personal information manager (PIM) program known in the art. The spell checker program 14 utilizes interface calls in order to access information from the address book 16.

\*\*WordPerfect is a registered trademark of Corel Corporation; Word Pro is a registered trademark of Lotus Development Corporation.

An Internet checking program 20 comprises a program object or function within the spell checker 14 and/or address book 16 program that is used to check contact information against information maintained in an Internet directory. For instance, if the contact information includes a URL address, then the Internet checking program 20 may check the format of the URL address or ping the address over the Internet to determine if the URL link is still valid.

The system further includes a display monitor 22 for displaying the graphical user interface (GUI) of the text editor program 12 and at least one input device 24, such as a touch pad, touch screen, mouse, pen stylus, keyboard, voice activated input, and/or any other input device known in the art capable of selecting displayed graphical elements and entering user input. Further, the computer 2 is connected to the Internet 26 and is capable of accessing Internet directories 28, such as the Yahoo Yellow pages or other on-line databases of phone numbers and contact addresses for persons and entities.

Figure 2:
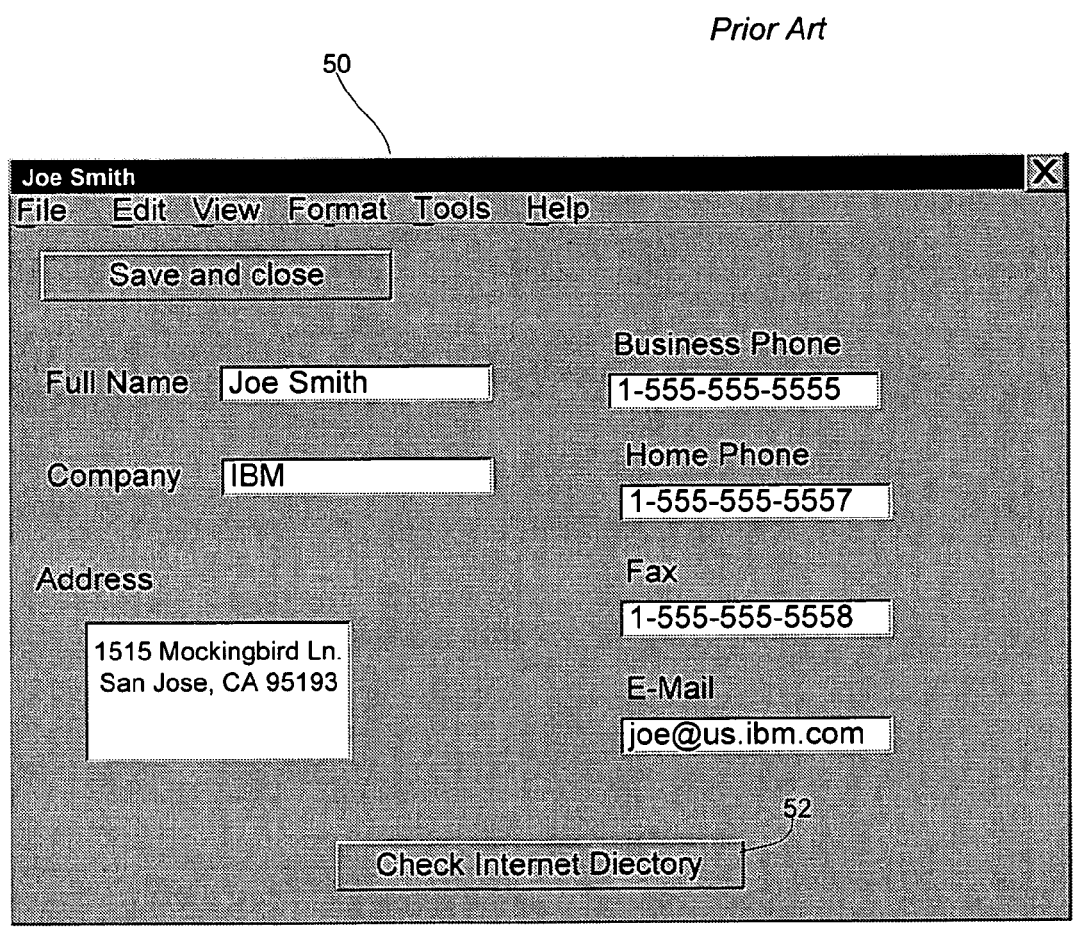
FIG. 2 illustrates a graphical user interface (GUI) form displaying contact fields in a record in an address book in a manner known in the art.

FIG. 2 illustrates an example of a graphical user interface (GUI) contact form 50 known in the art in which the user may review, revise, or enter contact information in a contact record in the address book 16 database. The contact form 50 displays the contact name, company, home phone number, business phone number, e-mail, and other contact information from a contact record in the address book 16. The contact form 50 further includes a "Check Internet Directory button" 52. Selection of this button 52 causes the address book 16 program to access an Internet directory 24 over the Internet 26 to search the Internet directory 28 using the full name information in the displayed contact form 50. Further, if the Internet directory 28 allows for "reverse look-ups", i.e., searching for a name from a telephone number, address or e-mail, then the address book 16 program may perform a reverse look-up search of the Internet directory 28 using the contact information in the address, telephone, and/or e-mail fields in the contact form 50. The address book program 16 may then display to the user the results of the reverse look up to allow the user to check or verify the information in the contact form 50 or allow the user to enter contact information from the search result in empty or already full fields, e.g., phone numbers, e-mail etc., located from the reverse look-up.

Figure 3:
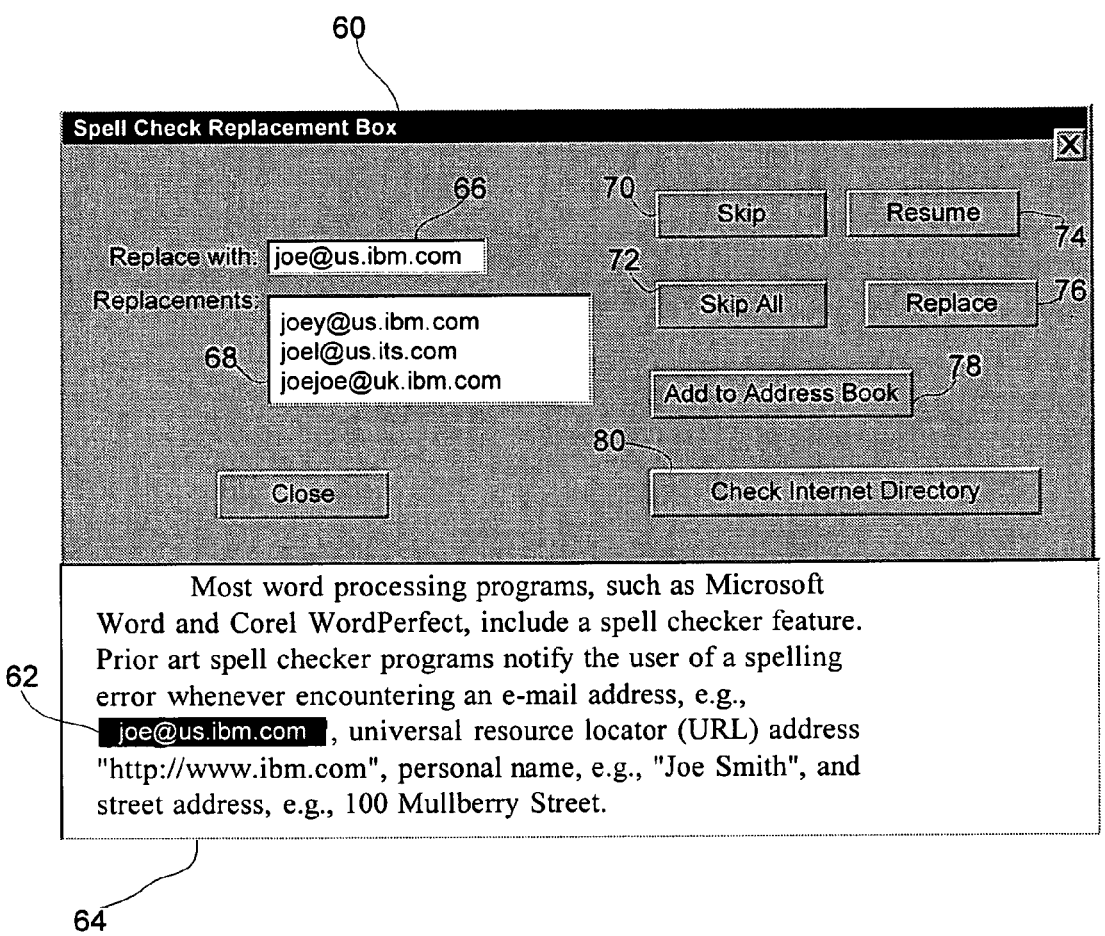
FIG. 3 illustrates a replacement box used with a spell checker program in accordance with preferred embodiments of the present invention.

FIG. 3 illustrates a replacement box 60 that is displayed by the spell checker 14 when identifying a name or contact address (e.g., phone number, e-mail, street address, etc.) of a person or entity in the document 18 that does not match names or contact addresses in the address book 16. In the replacement box 60 embodiment of FIG. 3, the spell checker 14 highlights 62 the contact phrase in text 64 that fails to match an entry in the address book 16 and displays the non-matching contact phrase in a "Replace with" box 66. The closest matching replacements found in the address book 16 are displayed in the "Replacements" box 68. The user may select the "Skip" button 70 to leave the highlighted contact phrase 62 unchanged in the text 64 or the "Skip All" button 72 to leave all instances of the contact phrase 62 unchanged in the text 64. The "Replace" button 76 is selected to replace the highlighted contact phrase 62 in the text 64 with a highlighted word in the "Replacements" box 66 or a new contact phrase the user enters into the "Replace with" box 66. Selection of the "Add to Address Book" button 78 displays a new contact record form from the address book 16, such as the record 50 shown in FIG. 2, displaying the highlighted 62 contact phrase in the "Replace with" box in the appropriate contact field in the address record. The user may fill in additional information in the other fields in the address record 50 then save the new record in the address book 16.

The user may further select the "Check Internet Directory" button 80 to cause the spell checker 14 to access a default or user specified Internet directory 28 over the Internet 26 and then search the Internet directory for the highlighted contact phrase 62. If there is a match, then the spell checker 14 could display a dialog box stating that a match occurred and further information on the matching entry in the Internet directory 28. The user may also be alerted if there is no match in the Internet directory 28.

Figure 4:
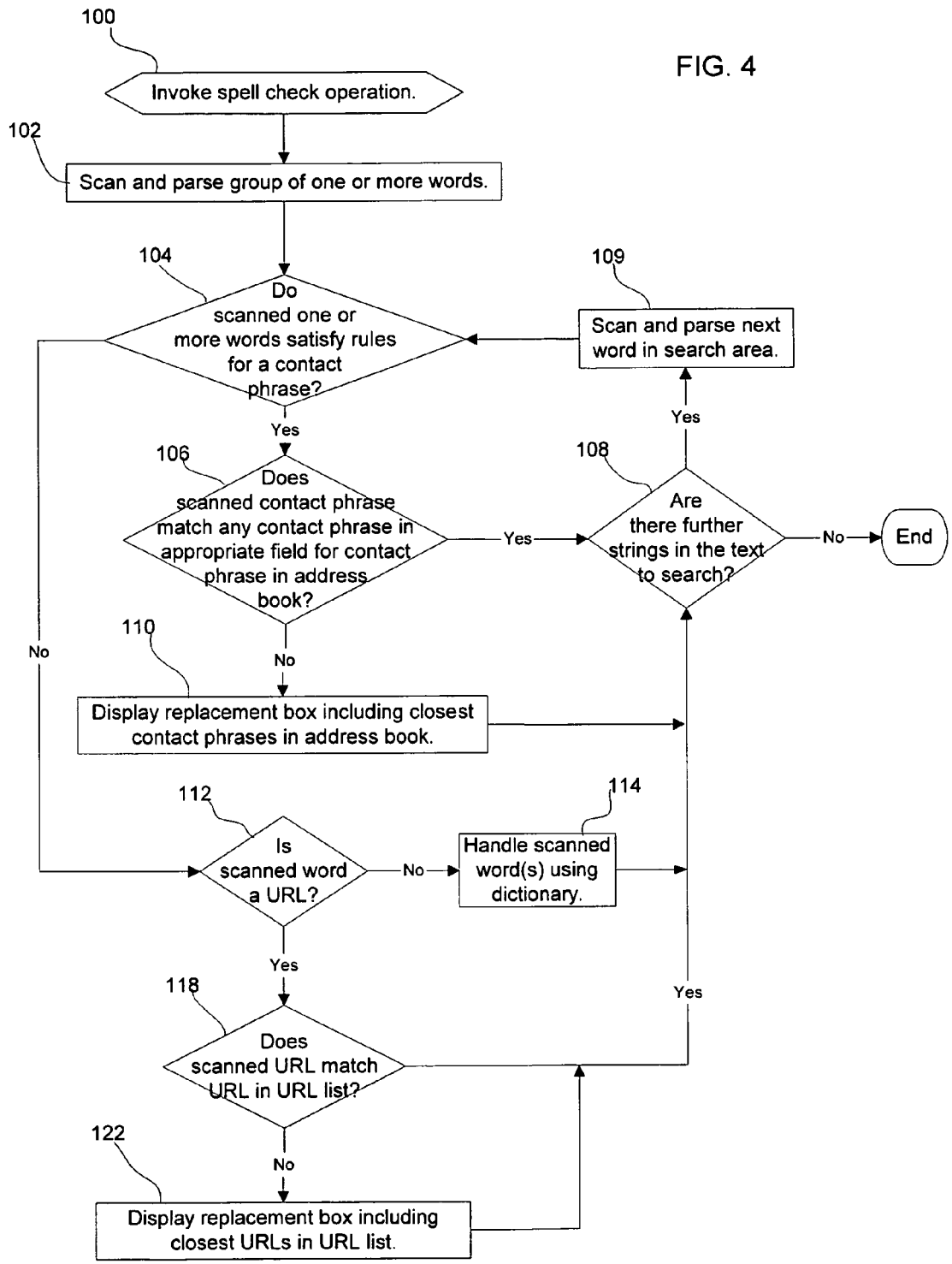
FIG. 4 illustrates logic implemented in a spell checker program to perform spell checking operations with respect to contact phrases, such as e-mail addresses, street addresses, names, phone numbers, etc., in accordance with preferred embodiments of the present invention.

FIG. 4 illustrates program logic implemented in the spell checker 14 to provide special handling for contact phrases, such as entity or person names, telephone numbers, e-mail addresses, street addresses, URLs, etc. At block 100, the spell checker 14 is invoked. In preferred embodiments the spell checker 14 is invoked from the text editor 12 user interface to spell check words within a selected area of text or the entire document 18. The spell checker 14 scans and parses (at block 102) a group of one or more words in a manner known in the art and determines (at block 104) whether one or more of the scanned words form a contact phrase (e.g., e-mail address, street address, name, telephone number, etc.) according to a set of contact phrase rules. In preferred embodiments, the spell checker 14 would maintain a set of rules of formats for contact phrases. If one or more consecutive words constitute a contact phrase according to the set of contact phrase rules, then the spell checker 14 determines (at block 106) whether the scanned contact phrase matches any contact phrase in an appropriate contact phrase field of one address book 16 record. This step would require that the spell checker 14 use specialized address book 16 application program interfaces (API) to query records in the address book 16.

In preferred embodiments, the address book 16 comprises a database of contact records, where each contact record includes fields for different types of contact phrases (e.g., e-mail address, street address, name, telephone number, etc.). In such case, as part of determining whether the scanned word(s) constitute a contact phrase according to contact rules, the spell checker 14 would also determine the type of contact phrase, e.g., e-mail address, street address, name, telephone number, etc. The spell checker 14 could then query the fields in the address book 16 records that correspond to the determined type of contact phrase. For instance, if the type of contact phrase is an e-mail address, then the spell checker would query the e-mail field in the address book 16 records; if the type is a telephone number, then the spell checker 14 would query all telephone number fields, e.g., business, home, fax, in the address book 16 records.

If (at block 106) the scanned contact phrase matches a field in one or more address book 16 records, then the spell checker 14 determines (at block 108) whether there are further strings to check. If not, the checking ends. Otherwise, if there are further words to check, then the spell checker 14 scans and parses (at block 109) the next words in the search area and returns to block 104. Otherwise, if (at block 106) the contact phrase does not match, then the spell checker 14 displays (at block 110) the replacement box 60 (FIG. 3) with the scanned contact phrase displayed in the "Replace with" box 66 and determined similar entries in the searched address book 16 records in the "Replacements" box 68. The user may then perform one of the actions in the replacement box 60 described above. After selecting a particular replacement action with respect to the scanned contact phrase, control proceeds to block 108 to scan and parse further words in the selected portion of the document 18 being checked by the spell checker 14.

If (at block 104) one or more of the scanned words do not constitute a contact phrase, then the spell checker 14 determines (at block 112) whether the scanned word constitutes a URL according to a set of URL rules. If the scanned word is not a URL, then the spell checker 14 handles (at block 114) the scanned word using a dictionary maintained by the spell checker in a manner known in the art. If the scanned word is a URL, then the spell checker 14 determines (at block 118) whether the scanned URL is in a URL list maintained in memory 6. The URL list comprises a list of URLs that the user has previously accessed or approved. If the scanned URL matches a URL in the URL list, then control proceeds to block 108 to consider further words in the document 18. Otherwise, if the URL does not match, then the spell checker 14 displays the replacement box 60 including the scanned URL in the "Replace with" box 66 and similar URLs in the URL list in the "Replacements" box 68. Control then proceeds to block 120 to consider the next words in the document 18.

Figure 5:
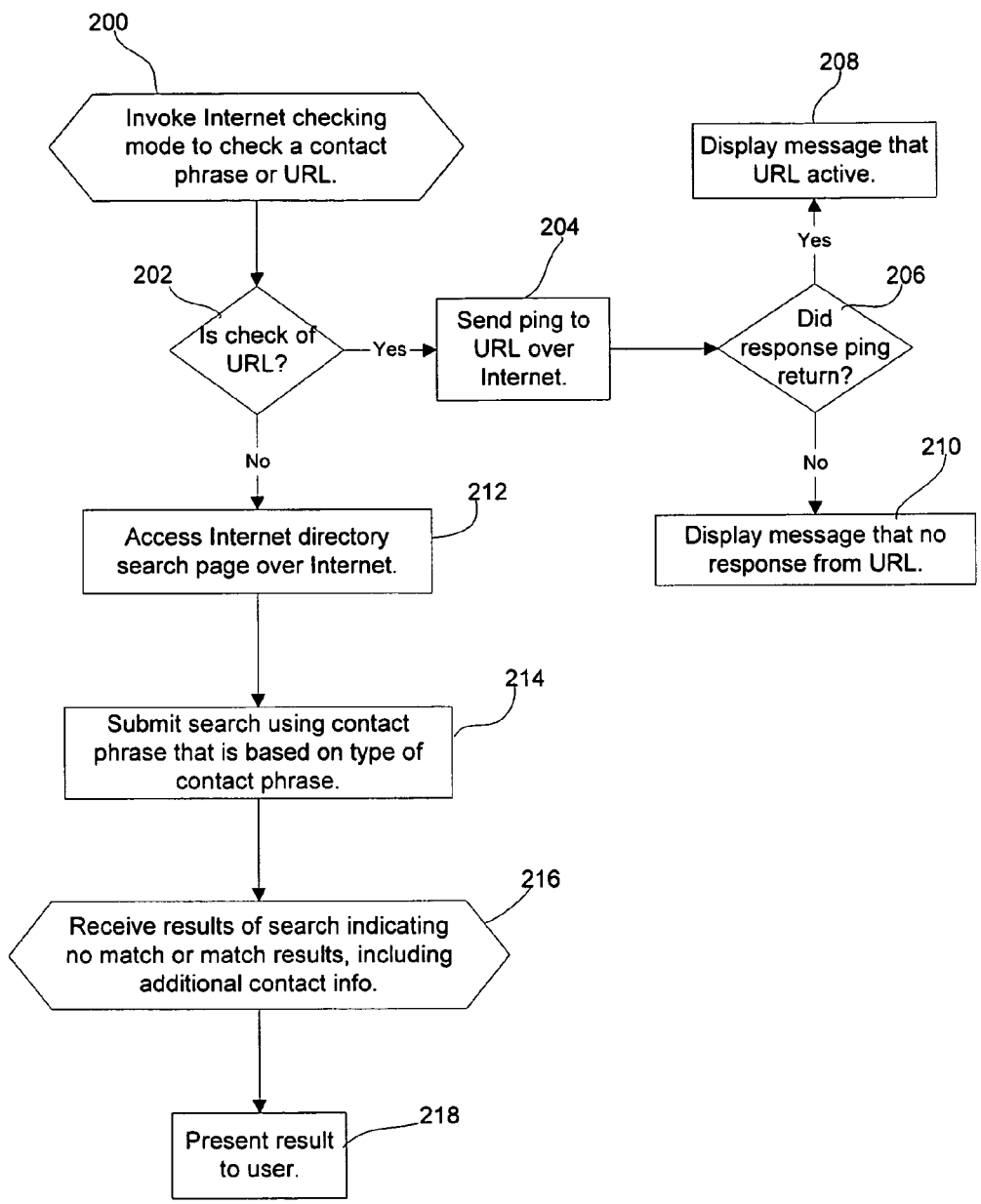
FIG. 5 illustrates logic to check contact information located by a spell checker program or check records of an address book against an Internet directory in accordance with preferred embodiments of the present invention.

FIG. 5 illustrates logic implemented in the Internet checking program 20, which may comprise a program component of the spell checker 14 and/or address book 16 program, to check any contact phrases in the document 18 or in address book 16 records against information maintained in an Internet directory 28. Control begins at block 200 with either the spell checker 14 or address book 16 program invoking the Internet checking program 20 or module. This function may be invoked by selecting the "Check Internet Directory" button 80 in the replacement box 60 (FIG. 3) to check the contact phrase in the "Replace with" box 60. Alternatively, this mode may be invoked by selection of the "Check Internet Directory" button 52 in the address book 16 contact form 50 (FIG. 2) to check the contact phrases in each contact field. For instance, when invoked from the address book 16, the Internet checking program 20 may search the Internet directory 28 on the full name in the form 50 to check whether the Internet directory 28 includes a street address, e-mail address or phone numbers for the checked name. Still further, the address book program 16 may perform a reverse look-up using the e-mail address or phone numbers maintained with the address book 16 record for the contact to verify the name and other contact information in the address book records 16 against the reverse look-up search results.

If (at block 202) the check is of a URL, then the Internet checking program 20 sends (at block 204) a ping over the Internet 26 to the URL. If (at block 206) a response to the ping is returned, then the Internet checking program 20 displays (at block 208) a message that the URL is active; otherwise, a message is displayed (at block 210) that the URL is not active. If (at block 202) the contact phrase being checked is not a URL, and instead a contact name or contact address (e.g., street address, e-mail address, phone number, etc.), then the Internet checking program 20 accesses (at block 212) the Internet directory 26 over the Internet 26 and submits (at block 214) a search using the contact phrase in the "Replacement with" box 66 or in the address book 16 record.

At block 216, the Internet checking program 20 receives the search results of the Internet directory 28, which may indicate that there were no matches, or provide a matching entry in the Internet directory 28, which would likely include additional contact information for the contact phrase searched. If the Internet checking program 20 is integrated with the spell checker 14, then the Internet checking program 20 may determine whether the contact phrase in the "Replacement with" box 66 is found in the Internet directory 24. If the searched contact phrase is a name, then the Internet checking program 20 may display to the user related contact information for that person. If the searched on contact phrase is a contact address, such as an e-mail address, street address, phone number, etc., then the Internet checking program 20 may display results from a reverse look-up operation. In this way, the user may review related contact information when invoking the Internet checking function during a spell check operation.

If the Internet checking program 20 is integrated with the address book 16 program and the contact name is searched, then the search results may provide related contact addresses for the searched name, e.g., phone number, e-mail, street address, etc. The Internet checking program 20 may then compare the returned search results with contact information stored in the address book 16 record to determine any discrepancies. The Internet checking program 16 may then display an interface to alert the user of discrepancies or prompt the user to input returned contact results into fields in the address book 16 record, or replace information in the address book 16 record fields with the contact search results.

In further embodiments, the user may schedule the Internet checking program 20 to perform periodic checking of all records in the address book 16 against information maintained in the Internet directory 26 during off-hours. The results may then be presented to the user to notify the user of any inconsistencies and allow the user to input the returned contact information in the appropriate fields in the address book 16 records.

In still further embodiments, the spell checker 14 may check the consistency of the syntax used in contact phrases, such as telephone numbers, URL addresses etc. The spell checker 14 would buffer all contact information to be checked for inconsistencies. After checking the entire page or selected area, the spell checker 14 would compare the syntax used for buffered contact phrases of a particular type and notify the user of any inconsistencies in the syntax used. For instance, the spell checker 14 would compare the format used for phone numbers, e.g., 310-555-5555, 555-5556, (310) 555-5557, and note that in each case a different syntax was used for the numbers. The spell checker 14 would alert the user to the presence of different syntax for phone numbers. Similarly, the spell checker 14 may compare the syntax of URLs in the document, e.g., www.ibm.com, http://www.ibm.com, etc., and notify the user of any inconsistency. Still further, the spell checker 14 could check whether the syntax of a URL is correct, such as checking whether the correct forward slashes "//" following the "http" are used as opposed to incorrectly using back slashes "\\". This consistency checking feature allows the user to improve the appearance of the document by consistently using the same format for contact information.

Preferred embodiments provide a program and user interface to extend the capabilities of spell checker programs to provide spell checking and confirmation of contact phrases in a document 18. Further, preferred embodiments provide a technique for real-time checking of address information entered into a document 18 or in address book 16 records against an Internet directory 28 over the Internet 26. Preferred embodiments extend spell checker functions to accommodate the frequent use of electronic addresses and URLs that are often included in business and personal documents generated by word processing programs.

ALTERNATIVE EMBODIMENTS AND CONCLUSIONS

This concludes the description of the preferred embodiments of the invention. The following describes some alternative embodiments for accomplishing the present invention.

The preferred embodiments may be implemented as a method, apparatus or program using standard programming and/or engineering techniques to produce software, firmware, hardware, or any combination thereof. The program, code and instructions in which the preferred embodiments are implemented are accessible from and embedded in an information bearing medium, which may comprise one or more computer-readable devices, firmware, programmable logic, memory devices (e.g., EEPROMs, ROMs, PROMs, RAMs, SRAMs, etc.), hardware, electronic devices, a computer readable magnetic storage unit, CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention.

The preferred algorithm described particular steps as occurring in a particular order. However, in further embodiments the order of the steps may be changed and certain steps removed and added without departing from the scope of the invention. Moreover, different steps may be performed to execute the overall operation of the algorithm.

The preferred embodiment GUIs, such as the address book form 50 and replacement box 60 provided particular fields in a particular layout. However, any GUI arrangement may be used to present the information and functions provided herein to the user. Further, the GUI panels described in FIGS. 2 and 3 may include more or less information than shown in the exemplar figures.

The preferred embodiment GUI was described as having particular pushbuttons to cause a particular set of actions to occur. In further embodiments, the GUI panels for the composition tool may include additional pushbuttons to provide additional functions or combinations of functions described herein.

In preferred embodiments, the Internet checking program 20 checked a single Internet directory 28 over the Internet 26. In alternative embodiments, multiple Internet directories may be checked. Alternatively, directories stored locally or available over other networks known in the art, e.g., an Intranet, private LAN, etc., may be checked.

In summary, the present invention provides a computer implemented method, system, and program for checking text in an electronic document. Words in the text are scanned and parsed. For each set of one or more scanned and parsed words, a determination is made of whether one or more words form a contact phrase providing information to identify or address a person or entity. After one contact phrase is scanned, contact information is accessed including contact phrases. The contact information is searched to determine if the scanned contact phrase matches contact phrases in the searched contact information.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for checking text in an electronic document, comprising:
    scanning and parsing words in the text;
    for each set of one or more scanned and parsed words, determining whether one or more words form a scanned contact phrase providing information to identify or address a person or entity, wherein said scanned contact phrases comprise one of a name, phone number, street address, e-mail address, and URL; and
    upon determining that one or more words form a scanned contact phrase, performing:
        accessing contact information stored in a computer readable address book including contact phrases;
        searching the contact information to determine if the scanned contact phrase matches contact phrases in the searched contact information;
        determining one or more contact phrases in the contact information that are similar to the scanned contact phrase if the scanned contact phrase does not match one contact phrase in the contact information; and
        displaying the determined similar contact phrases, wherein the user is capable of selecting one displayed similar contact phrase to substitute for the scanned contact phrase; and
    upon determining that one or more words do not form a scanned contact phrase, performing:
        spell checking words determined not to form a scanned contact phrase; and
        performing said scanned contact phrase determining with respect to other words of said text.

2. The method of claim 1, further comprising:
    displaying a graphical box for one scanned contact phrase that does not match contact phrases in the contact information, wherein the user is capable of using the displayed graphical box to accept the scanned contact phrase or select another contact phrase to substitute for the scanned contact phrase.

3. The method of claim 2, further comprising:
    determining at least one contact phrase in the contact information that is similar, but not identical, to the scanned contact phrase if the scanned contact phrase does not match one contact phrase in the contact information; and displaying the determined contact phrases in the displayed graphical box, wherein the user is capable of using the displayed graphical box to select one displayed contact phrase to substitute for the scanned contact phrase.

4. The method of claim 1, wherein the contact information comprises contact records for different contacts in a computer readable address book, wherein each contact record is capable of including multiple different contact phrases for one contact.

5. The method of claim 1, wherein the scanned contact phrase comprises a URL address, further comprising:
determining whether the scanned URL contact phrase addresses an accessible page on the Internet; and
presenting information indicating whether the scanned URL addresses an accessible page on the Internet.

6. The method of claim 1, wherein the scanned contact phrase comprises a name or contact address, further comprising:
submitting a search request over the Internet to an Internet directory for the scanned contact phrase; and
receiving information indicating that there is no match for the scanned contact phrase in the Internet directory or that there is a match.

7. The method of claim 1, further comprising:
adding the scanned contact phrase to the contact information if the scanned contact phrase does not match one contact phrase in the contact information.

8. The method of claim 1, further comprising:
buffering contact phrases of a same type of contact information;
determining whether the buffered contact phrases of the same type use consistent syntax; and
notifying a user of inconsistencies in the syntax for the buffered contact phrases.

9. The method of claim 1, wherein the scanned contact phrases include at least one URL address, further comprising:
determining whether each scanned URL contact phrase uses a correct URL syntax; and
notifying the user of incorrect syntax for at least one of the scanned URL contact phrases.

10. A system for checking text in an electronic document, comprising:
a computer;
a display monitor;
a computer readable medium including a computer program, wherein the computer program causes the computer to perform:
scanning and parsing words in the text;
for each set of one or more scanned and parsed words, determining whether one or more words form a scanned contact phrase providing information to identify or address a person or entity, wherein said scanned contact phrases comprise one of a name, phone number, street address, e-mail address, and URL; and
upon determining that one or more words form a scanned contact phrase, performing:
accessing contact information stored in a computer readable address book including contact phrases;
searching the contact information to determine if the scanned contact phrase matches contact phrases in the searched contact information;
determining one or more contact phrases in the contact information that are similar to the scanned contact phrase if the scanned contact phrase does not match one contact phrase in the contact information; and
displaying the determined similar contact phrases on the display monitor, wherein the user is capable of selecting one displayed similar contact phrase to substitute for the scanned contact phrase; and
upon determining that one or more words do not form a scanned contact phrase, performing:
spell checking words determined not to form a scanned contact phrase; and
performing said scanned contact phrase determining with respect to other words of said text.

11. The system of claim 10, further comprising:
wherein the computer program further causes the computer to perform displaying a graphical box for one scanned contact phrase in the display monitor that does not match contact phrases in the contact information, wherein the user is capable of using the displayed graphical box to accept the scanned contact phrase or select another contact phrase to substitute for the scanned contact phrase.

12. The system of claim 11, wherein the computer program further causes the computer to perform:
determining at least one contact phrase in the contact information that is similar, but not identical, to the scanned contact phrase if the scanned contact phrase does not match one contact phrase in the contact information; and
displaying the determined contact phrases in the displayed graphical box, wherein the user is capable of using the displayed graphical box to select one displayed contact phrase to substitute for the scanned contact phrase.

13. The system of claim 10, wherein the contact information comprises contact records for different contacts in a computer readable address book, wherein each contact record is capable of including multiple different contact phrases for one contact.

14. The system of claim 10, wherein the scanned contact phrase comprises a URL address, and wherein the computer program further causes the computer to perform:
determining whether the scanned URL contact phrase addresses an accessible page on the Internet; and
presenting information indicating whether the scanned URL addresses an accessible page on the Internet.

15. The system of claim 10, wherein the scanned contact phrase comprises a name or contact address, and wherein the computer programs further causes the computer to perform:
submitting a search request over the Internet to au Internet directory for the scanned contact phrase; and
receiving information indicating that there is no match for the scanned contact phrase in the Internet directory or that there is a match.

16. The system of claim 10, wherein the computer program is further capable of causing the computer to perform:
adding the scanned contact phrase to the contact information if the scanned contact phrase does not match one contact phrase in the contact information.

17. The system of claim 10, wherein the computer program is further capable of causing the computer to perform:
buffering contact phrases of a same type of contact information;
determining whether the buffered contact phrases of the same type use consistent syntax; and notifying a user of inconsistencies in the syntax for the buffered contact phrases.

18. The system of claim 10, wherein the scanned contact phrases include at least one URL address, and wherein the computer program is further capable of causing the computer to perform:

determining whether each scanned URL contact phrase uses a correct URL syntax; and notifying the user of incorrect syntax for at least one of the scanned URL contact phrases.

19. A program for checking text in an electronic document, wherein the program is stored in a computer readable medium capable of causing a computer to perform:

scanning and parsing words in the text;

for each set of one or more scanned and parsed words, determining whether one or more words form a scanned contact phrase providing information to identify or address a person or entity, wherein said scanned contact phrases comprise one of a name, phone number, street address, e-mail address, and URL; and upon determining that one or more words form a scanned contact phrase, performing:

accessing contact information stored in a computer readable address book including contact phrases;

searching the contact information to determine if the scanned contact phrase matches contact phrases in the searched contact information;

determining one or more contact phrases in the contact information that are similar to the scanned contact phrase if the scanned contact phrase does not match one contact phrase in the contact information; and displaying the determined similar contact phrases, wherein the user is capable of selecting one displayed similar contact phrase to substitute for the scanned contact phrase; and upon determining that one or more words do not form a scanned contact phrase, performing:

spell checking words determined not to form a scanned contact phrase; and performing said scanned contact phrase determining with respect to other words of said text.

20. The program of claim 19, wherein the program is further capable of causing the computer to performing:

displaying a graphical box for one scanned contact phrase that does not match contact phrases in the contact information, wherein the user is capable of using the displayed graphical box to accept the scanned contact phrase or select another contact phrase to substitute for the scanned contact phrase.

21. The program of claim 20, wherein the program is further capable of causing the computer to perform;

determining at least one contact phrase in the contact information that is similar, but not identical, to the scanned contact phrase if the scanned contact phrase does not match one contact phrase in the contact information; and displaying the determined contact phrases in the displayed graphical box, wherein the user is capable of using the displayed graphical box to select one displayed contact phrase to substitute for the scanned contact phrase.

22. The program of claim 19, wherein the contact information comprises contact records for different contacts in a computer readable address book, wherein each contact record is capable of including multiple different contact phrases for one contact.

23. The program of claim 19, wherein the scanned contact phrase comprises a URL address and wherein the program is further capable of causing the computer to perform:

determining whether the scanned URL contact phrase addresses an accessible page on the Internet; and presenting information indicating whether the scanned URL addresses an accessible page on the Internet.

24. The program of claim 19, wherein the scanned contact phrase comprises a name or contact address and wherein the program is further capable of causing the computer to perform:

submitting a search request over the Internet to an Internet directory for the scanned contact phrase; and receiving information indicating that there is no match for the scanned contact phrase in the Internet directory or that there is a match.

25. The program of claim 19, wherein the program is further capable of causing the computer to perform:

adding the scanned contact phrase to the contact information if the scanned contact phrase does not match one contact phrase in the contact information.

26. The program of claim 19, wherein the program is further capable of causing the computer to perform:

buffering contact phrases of a same type of contact information;

determining whether the buffered contact phrases of the same type use consistent syntax; and notifying a user of inconsistencies in the syntax for the buffered contact phrases.

27. The program of claim 19, wherein the scanned contact phrases include at least one URL address and wherein the program is further capable of causing the computer to perform:

determining whether each scanned URL contact phrase uses a correct URL syntax; and notifying the user of incorrect syntax for at least one of the scanned URL contact phrases.

* * * * *